United States Patent
Gonzalez et al.

(10) Patent No.: US 9,928,512 B2
(45) Date of Patent: Mar. 27, 2018

(54) INTELLIGENT DETECTION OF CHANGED USER PARAMETERS IN A SYSTEM

(71) Applicant: International Business Machines Corporation, Armonk, NY (US)

(72) Inventors: Pablo R. M. Gonzalez, Sao Paulo (BR); Tiago Pagani, Sao Paulo (BR); Krzysztof A. Rudek, Cracow (PL); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 14/952,282

(22) Filed: Nov. 25, 2015

(65) Prior Publication Data

US 2017/0148031 A1    May 25, 2017

(51) Int. Cl.
| | |
|---|---|
| *H04L 12/26* | (2006.01) |
| *G06F 17/30* | (2006.01) |
| *G06F 21/31* | (2013.01) |
| *G06Q 30/00* | (2012.01) |
| *H04L 29/08* | (2006.01) |
| *H04L 12/58* | (2006.01) |

(52) U.S. Cl.
CPC ........... *G06Q 30/016* (2013.01); *H04L 51/24* (2013.01); *H04L 67/306* (2013.01)

(58) Field of Classification Search
CPC combination set(s) only.
See application file for complete search history.

(56) References Cited

U.S. PATENT DOCUMENTS

| | | |
|---|---|---|
| 6,334,121 B1 | 12/2001 | Primeaux |
| 7,349,530 B2 | 3/2008 | Griffiths |
| 8,386,386 B1 | 2/2013 | Zhu |
| 8,554,770 B2 | 10/2013 | Purdy |
| 2005/0033777 A1* | 2/2005 | Moraes ............. G06F 17/30575 |

(Continued)

FOREIGN PATENT DOCUMENTS

| | | |
|---|---|---|
| CN | 102413437 | 4/2012 |
| JP | 2007280185 | 10/2007 |

OTHER PUBLICATIONS

Vollino, B., Becker, K., A Framework for Web Service Usage Profiles Discovery, Web Services (ICWS), 2013 IEEE 20th International Conference, Jun. 28, 2013-Jul. 3, 2013, http://ieeexplore.ieee.org/xpl/articleDetails.jsp?tp=&arnumber=6649569&mathcBoolean%3Dtrue%26queryText%3DA+Framework+for+web+service+usage+profiles+discovery.

*Primary Examiner* — Mark A Fleischer
(74) *Attorney, Agent, or Firm* — George R. McGuire; Bond Schoeneck & King, PLLC; John Pivnichny

(57) ABSTRACT

A system for intelligently determining changes to a service provider user's parameters in the service provider system. The system generally includes a service provider's computer system which contains a computer and a user database stored thereon; a user carried service provider tool, such as an ATM card, a cell phone, and the like; and a remote device whose use by the user is monitored by the service provider, such as an ATM machine (e.g., if the service provider is a bank and the service provider tool is an ATM card) or a phone or cell tower (e.g., if the service provider is a telecommunications service provider and the tool is a cell phone). Activity amongst the computer system, user carried service provider tool, and remote device is wirelessly monitored by the service provider (or an agent of the service provider) in an electronic communications network.

16 Claims, 3 Drawing Sheets

(56) References Cited

U.S. PATENT DOCUMENTS

| | | | | |
|---|---|---|---|---|
| 2012/0109882 A1* | 5/2012 | Bouse | .................. | H04L 67/306 |
| | | | | 707/607 |
| 2012/0290712 A1* | 11/2012 | Walter | ................ | H04L 63/1416 |
| | | | | 709/224 |
| 2013/0212008 A1* | 8/2013 | Edwards | .............. | G06Q 20/381 |
| | | | | 705/39 |
| 2014/0059695 A1 | 2/2014 | Parecki | | |

\* cited by examiner

INTELLIGENT DETECTION OF CHANGED USER PARAMETERS IN A SYSTEM

BACKGROUND

The present invention relates generally to computer implemented systems for dynamically monitoring a service bureau's users, identifying a change to a user's parameters, notifying a user of suspected change to his or her parameters, and confirming the user's parameters.

Service bureaus (companies, agencies, organizations, etc. that provide services to customers/users) typically maintain a database of parameters associated with each of their users. For example, a bank would likely maintain the home address of its customers in a database record so that it can mail statements and other documents to the customer at a known address. However, in the context of a bank, many times a bank's customer will move and not notify the bank of the change of address. Such inaction on the part of the customer creates an issue for the bank insofar as its statements and other documents are not necessarily reaching the customer. Without the customer notifying the bank of his or her change of address, there is little the bank can do to effectively update its records associated with this customer.

In such a circumstance, the service bureau might send periodic e-mails, mailings, text messages, phone calls or the like to all of its customers asking for certain parameters to be confirmed or reported changed. Such non-personalized inquiries, however, are often ignored by the customers and there is not any way of ensuring the customers respond to the inquiry.

It is therefore an object and advantage of the present invention to provide a system that dynamically detects a probable change in at least one customer parameter maintained by a service provider.

Other objects and advantages of the present invention will in part be obvious and in part appear hereinafter.

SUMMARY

In accordance with the foregoing objects and advantages, the present invention provides, in one embodiment, A computer implemented process for dynamically detecting a change to a user parameter that is associated with and maintained within a service provider's computerized database, comprising (1) storing an original user parameter in the computerized database; (2) using a pattern matching algorithm for identifying a first pattern in the use of a service offered by the service provider by a user and that is indicative of the state of the original user parameter; (3) using a pattern comparison algorithm for determining whether the original user parameter stored in the computerized database is likely to have changed based upon the first pattern; (4) carrying a notification to be sent to the user regarding the detected change in the user parameter; (5) receiving from the user an updated user parameter different from the original user parameter; and (6) storing the updated user parameter in the computerized database in place of the original user parameter.

In one aspect, the present invention further comprises using the pattern matching algorithm for identifying a second pattern in the use of a service offered by the service provider by a user, wherein the pattern comparison algorithm determines that the second pattern is indicative of a change to the original user parameter.

In another aspect of the invention the user parameter is the user's residential address and the second pattern is indicative of the user having a changed residential address. Alternatively, the user parameter is the user's business address and the second pattern is indicative of the user having a changed business address.

In another aspect of the present invention, the step of identifying a first pattern comprises electronic monitoring of the use of a tool by the user. In a further aspect of the invention, the electronic monitoring step comprises remotely determining the geographic location of the user when using the tool.

In one aspect of the invention, the tool is an ATM card and the step of monitoring the use of the geographic location comprises electronically identifying the location of the ATM machine on which the ATM card was used. In another aspect of the present invention, the tool is a cell phone and the step of monitoring the use of the geographic location comprises electronically identifying the location of the cell phone when used.

In another aspect of the invention, a computer program product is provided for dynamically detecting a changed user parameter that is associated with and maintained within a service provider's computerized database, the computer program product comprising a computer readable storage medium having program instructions embodied therewith, wherein the computer readable storage medium is not a transitory signal per se, the program instructions are readable by a computer to cause the computer to perform a method comprising (1) receiving an original user parameter in the computerized database; (2) using a pattern matching algorithm for identifying a first pattern in the use of a service offered by the service provider by a user and that is indicative of the state of the original user parameter; (3) using a pattern comparison algorithm for determining whether the original user parameter stored in the computerized database is likely to have changed based upon the first pattern; (4) carrying a notification to be sent to the user regarding the detected change in the user parameter; (5) receiving from the user an updated user parameter different from the original user parameter; and (6) storing the updated user parameter in the computerized database in place of the original user parameter.

In another aspect of the invention, a system is provided for dynamically detecting a changed user parameter that is associated with and maintained within a service provider's computerized database, the system comprising (1) a service provider computer network comprising at least one computer; (2) a database in electronic communication with said service provider computer, wherein said database comprises data representative of a user parameter; (3) a user carried tool, wherein use thereof is detectable by said service provider computer network; (4) a remote device with which said user carried service provider tool is usable and the use of which is monitored by said service provider computer network; and (5) a computer program product for dynamically detecting a changed user parameter that is associated with and maintained within said database, the computer program product comprising a computer readable storage medium having program instructions embodied therewith, wherein the computer readable storage medium is not a transitory signal per se, and the program instructions is readable by said computer.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
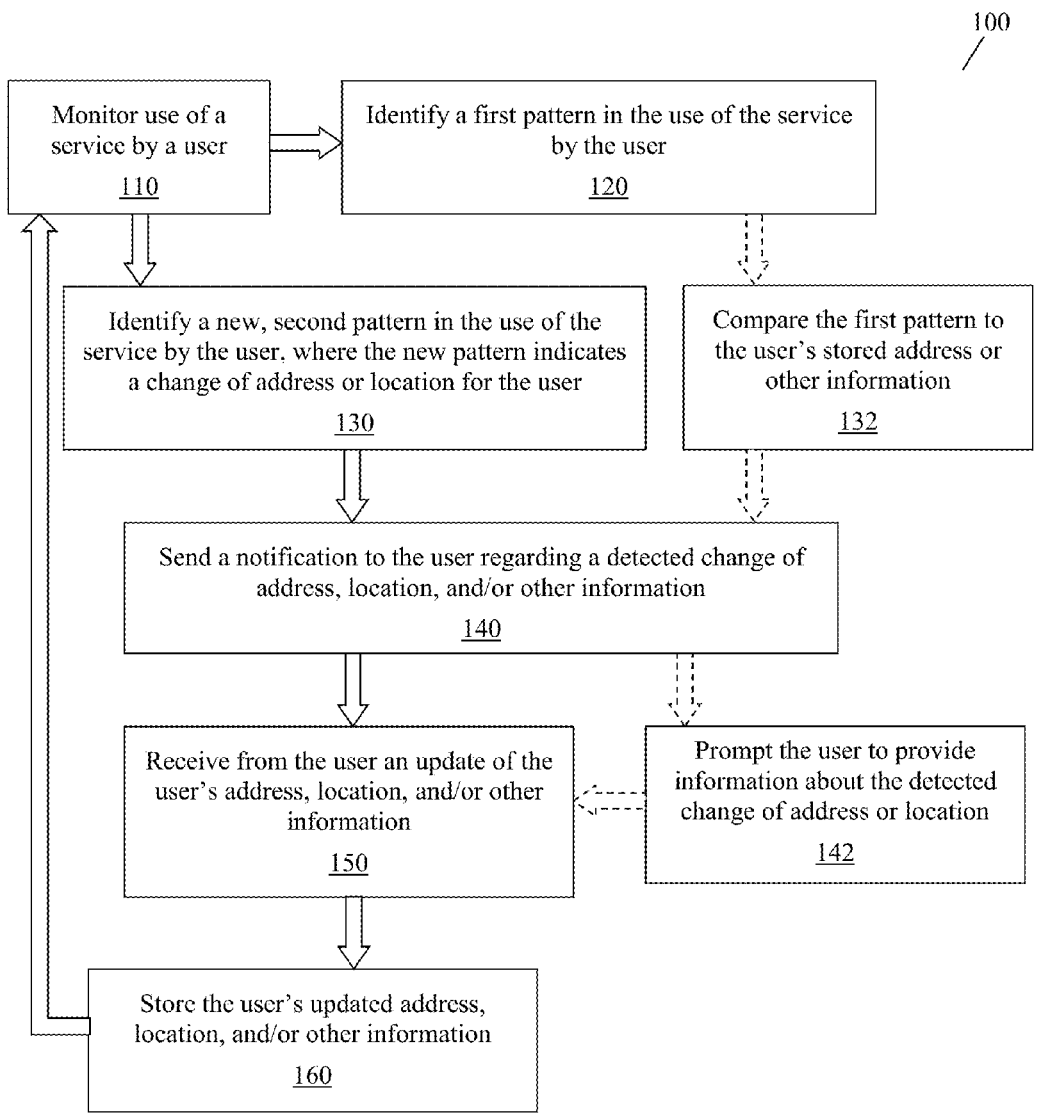
FIG. 1 is a flow chart illustrative of an embodiment of the present invention.

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
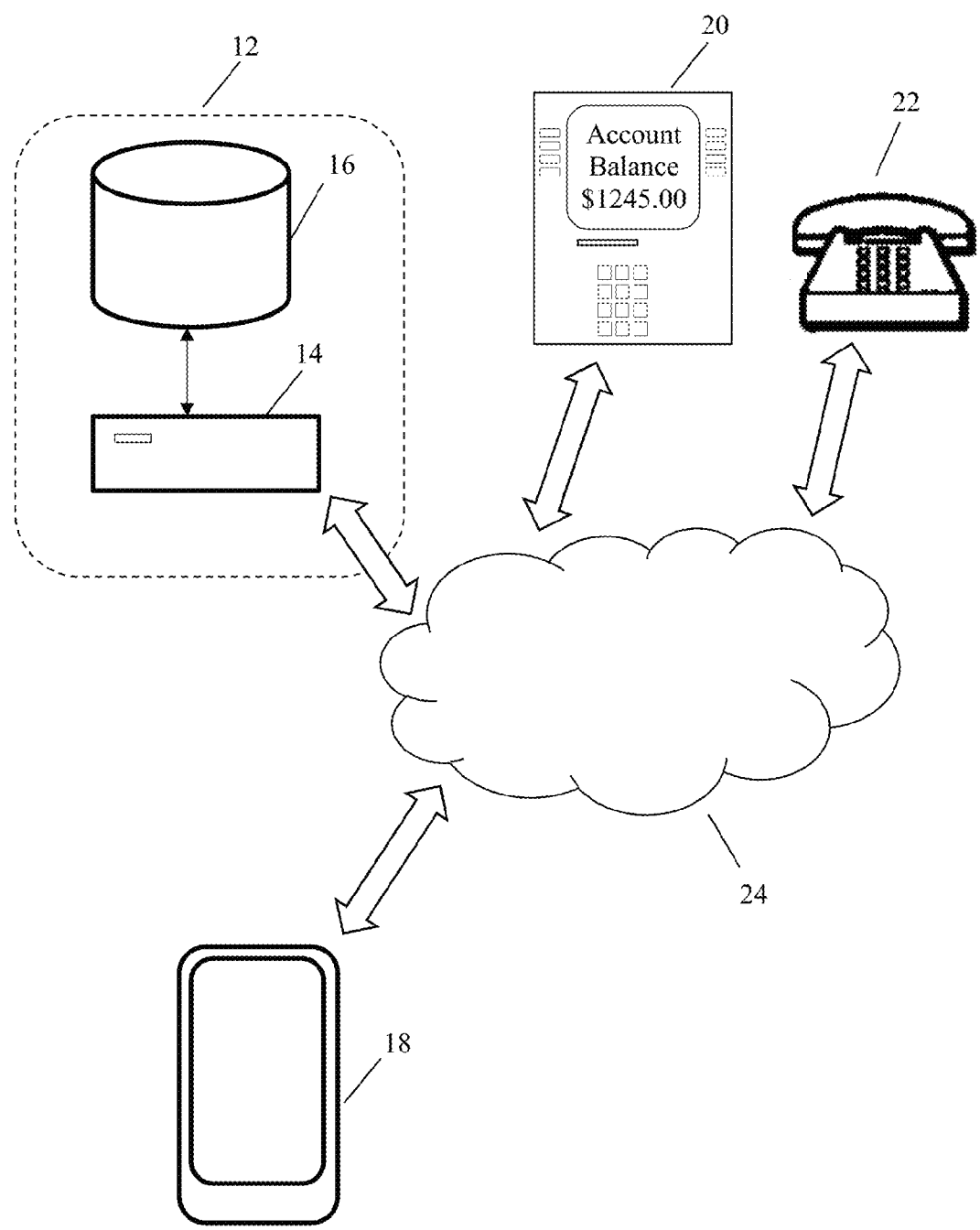
FIG. 3 is a schematic view of an embodiment of the present invention.

Referring now to the drawings, in which like reference numerals refer to like parts throughout, the present invention provides a computer system 10 for intelligently determining changes to a service provider user's parameters in the service provider system. With reference to FIG. 3, the computer system 10 generally comprises a service provider's computer system 12 which contains a computer 14 and a user database 16 stored thereon in a conventional manner. Database 16 contains user data fields specific to the service provider's service offerings, including, for example, user name, physical/mailing address, phone number, and e-mail address. System 10 further comprises a user carried tool 18 that can be monitored by the service provider, such as an ATM card, a cell phone, and the like. System 10 further comprises a remote device whose use by the user is monitored by the service provider, such as an ATM machine 20 (e.g., if the service provider is a bank and the service provider tool is an ATM card) or a phone 22 (e.g., if the service provider is a telecommunications service provider and the tool is a cell phone). As shown in FIG. 3, activity amongst computer system 12, user carried service provider tool 18, and remote device 20/22 is wirelessly monitored by the service provider (or an agent of the service provider) in a computer network 24, which may, for example, be the Internet, a cloud based network, or other electronic communications network.

Figure 2:
FIG. 2 is a plan view of map to help illustrate an aspect of the invention.

The system 10 operates according to the process shown generally at 100. Process 100 begins by software running on the computer system 12 of a service provider dynamically monitoring use of a particular service by a user (through the user's use of tool 18 which communicates either directly or indirectly with computer system 12 each time it is used) at step 110. The software running on computer system 12 will then identify a first pattern in the use of the service by the user in step 120. As an example illustrated in FIG. 2, the pattern may be that the user regularly uses an ATM machine 200 located within a predetermined radius 202, or an another example may be a predetermined radius 208 from which the majority of cellular calls are made by the user. Upon pattern matching having been done in step 110, the software running on computer system 12 may eventually identify a second pattern in the use of the service by the user in step 130 using the same pattern matching algorithm, wherein the second pattern is indicative of a change of address of the user. As an example illustrated in FIG. 2, the second pattern may be that the user now regularly uses an ATM machine 204 that is located within a predetermined radius 206 that is geographically remote from radius 202, or now makes the majority of cell calls from a predetermined radius 210 that is remote from radius 208. After identifying the first pattern in step 220, the software of system 10 will run a pattern match that compares the first pattern to the corresponding parameter of the user stored in database 16. (e.g., physical address, email address, etc.) to determine whether the user likely has moved, in step 132. If in step 132 system 10 determines that it is likely that the parameter of the user has likely changed (for example, whether the user has moved when using residential address as the parameter being monitored) Upon identification of a second pattern in step 130, the software running on computer system 12 will then cause a notification to be sent to the user (e.g., by email, SMS text, or other communications protocol) regarding a detected change of address, location, and/or other information (depending on the parameter being monitored), in step 140. The software can cause a prompt to then be sent to the user to provide information about the detected change of parameter (e.g., address, location, etc.) in step 142, following which (or in the event the user does not need prompting) in step 150 computer system 12 receives from the user (via email, phone call, SMS text, or other communications protocol) an update of the user's parameter (e.g., address, location, and/or other information depending upon the parameter being monitored). The software will then store in non-transitory memory of computer system 12 the user's updated address, location, and/or other information in step 160, and the process will begin again at step 110 using this updated parameter data.

What is claimed is:

1. A computer implemented process configured to dynamically detect a change to a user's home geographic location that is maintained within a service provider's computerized database, comprising the steps of:
   a) storing the user's home geographic location in the computerized database;
   b) monitoring, electronically, the use by a user of a service tool offered by the service provider, wherein the electronic monitoring comprises remotely determining a current geographic location of the user when using the service tool, wherein the service tool is available in a plurality of different geographic locations;
   c) identifying, via said monitoring, a first pattern in the use of the service tool offered by the service provider by a user, wherein the first pattern is indicative of a change in the user's home geographic location, wherein identifying a first pattern comprises repeated use of the service tool within a geographic location other than the user's stored home geographic location;
   d) determining that the user's home geographic location stored in the computerized database has changed based upon the first pattern;
   e) sending a notification to the user regarding the determined change in the user's home geographic location;
   f) receiving from the user an updated user home geographic location; and
   g) storing the updated user home geographic location in the computerized database in place of the first user home geographic location.

2. The process according to claim 1, further comprising the step of identifying a second pattern in the use of a service tool offered by the service provider by a user, wherein said second pattern is indicative of a change to the user's home geographic location.

3. The process according to claim 1, wherein the user's home geographic location is the user's residential address.

4. The process according to claim 1, wherein the user's home geographic location is the user's business address.

5. The process according to claim 1, wherein the service tool is an ATM card.

6. The process according to claim 1, wherein the service tool is a cell phone.

7. A computer program product configured to dynamically detect a change to a user's home geographic location that is maintained within a service provider's computerized database, the computer program product comprising a computer readable storage medium having program instructions embodied therewith, wherein the computer readable storage medium is not a transitory signal per se, the program instructions are readable by a computer to cause the computer to perform a method comprising:
   a) receiving and storing the user's home geographic location in the computerized database;

b) receiving information indicative of the use by a user of a service tool offered by the service provider, wherein the information comprises a current geographic location of the user when using the service tool, and wherein the service tool is available in a plurality of different geographic locations;

c) identifying, via said received information a first pattern in the use of the service tool offered by the service provider by a user, wherein the first pattern is indicative of a change in the user's home geographic location, wherein identifying a first pattern comprises repeated use of the service tool within a geographic location other than the user's stored home geographic location;

d) determining that the user's home geographic location stored in the computerized database has changed based upon the first pattern;

e) sending a notification to the user regarding the determined change in the user's home geographic location;

f) receiving from the user an updated user home geographic location; and g) storing the updated user home geographic location in the computerized database in place of the first user home geographic location.

8. The computer program product according to claim 7, wherein the program instructions readable by a computer to cause the computer to perform a method further comprising identifying a second pattern in the use of a service tool offered by the service provider by a user, wherein said second pattern is indicative of a change to said user's home geographic location.

9. The computer program product according to claim 7, wherein the user's home geographic location is the residential address of the user.

10. The computer program product according to claim 7, wherein the user's home geographic location is the business address of the user.

11. A system configured to dynamically detect a change to a user's home geographic location parameter that is associated with and maintained within a service provider's computerized database, the system comprising:

a) a service provider computer network comprising at least one computer;

b) a database in electronic communication with said service provider computer, wherein said database comprises data representative of the user's home geographic location;

c) a user carried tool, wherein use thereof is detectable by said service provider computer network, and wherein use thereof provides information to the service provider computer network indicative of a current geographic location of the user when the tool is used;

d) a remote device with which said user carried service provider tool is usable and the use of which is monitored by said service provider computer network; and e) a computer program product for dynamically detecting a changed user parameter that is associated with and maintained within said database, the computer program product comprising a computer readable storage medium having program instructions embodied therewith, wherein the computer readable storage medium is not a transitory signal per se, and the program instructions are readable by said computer to cause the computer to perform a method comprising:

identifying a first pattern in the use of the tool, wherein identifying a first pattern comprises repeated use of the tool within a geographic location other than the user's stored home geographic location;

sending a notification to the user regarding a determined change in the user's home geographic location;

receiving from the user an updated user home geographic location; and storing the updated user home geographic location in the computerized database in place of the first user home geographic location.

12. The system according to claim 11, wherein the program instructions readable by a computer to cause the computer to perform a method further comprising identifying a second pattern in the use of a service offered by the service provider by a user, wherein said second pattern is indicative of a change to said user's home geographic location.

13. The system according to claim 11, wherein said first user parameter is the residential address of the user.

14. The system according to claim 11, wherein said first user parameter is the business address of the user.

15. The system according to claim 11, wherein the remote device is an ATM machine.

16. The system according to claim 11, wherein the remote device is a cell tower.

\* \* \* \* \*